J. A. CHAMBERS.
MANUFACTURE OF GLASS.
APPLICATION FILED OCT. 8, 1918.
1,309,274.
Patented July 8, 1919.
2 SHEETS—SHEET 1.
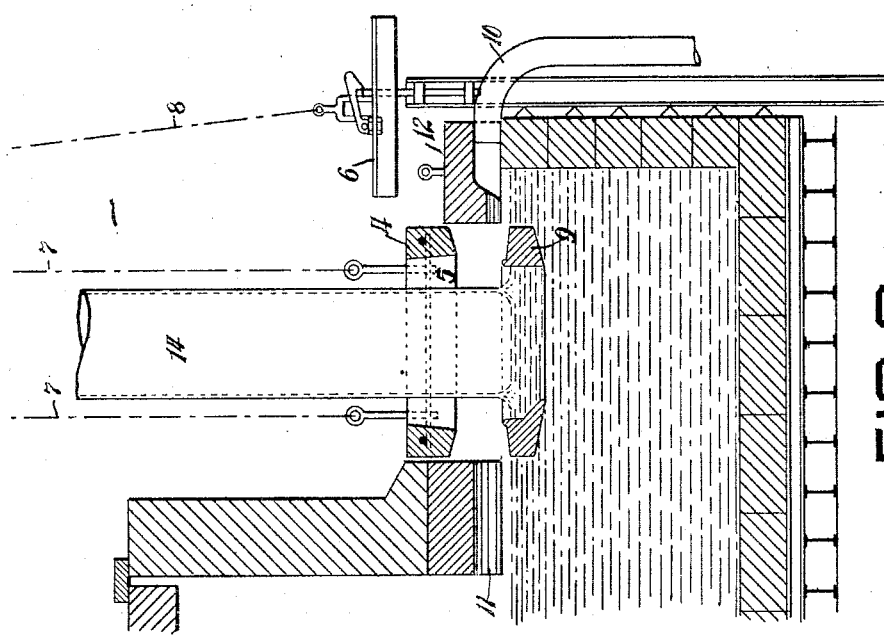
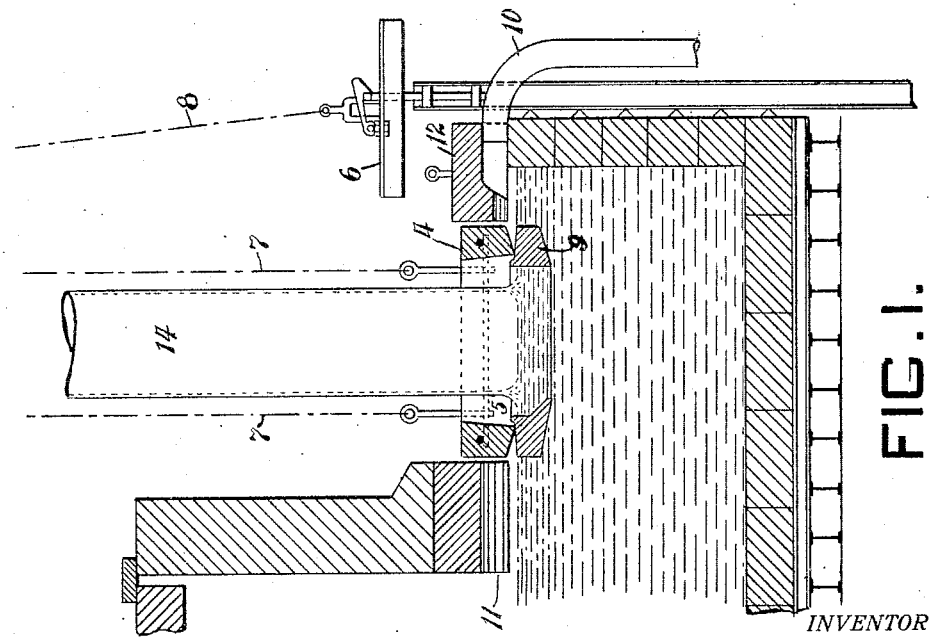
INVENTOR.
James A. Chambers
by James K. Bakewell
ATTORNEY.

J. A. CHAMBERS.
MANUFACTURE OF GLASS.
APPLICATION FILED OCT. 8, 1918.
1,309,274.
Patented July 8, 1919.
2 SHEETS—SHEET 2.
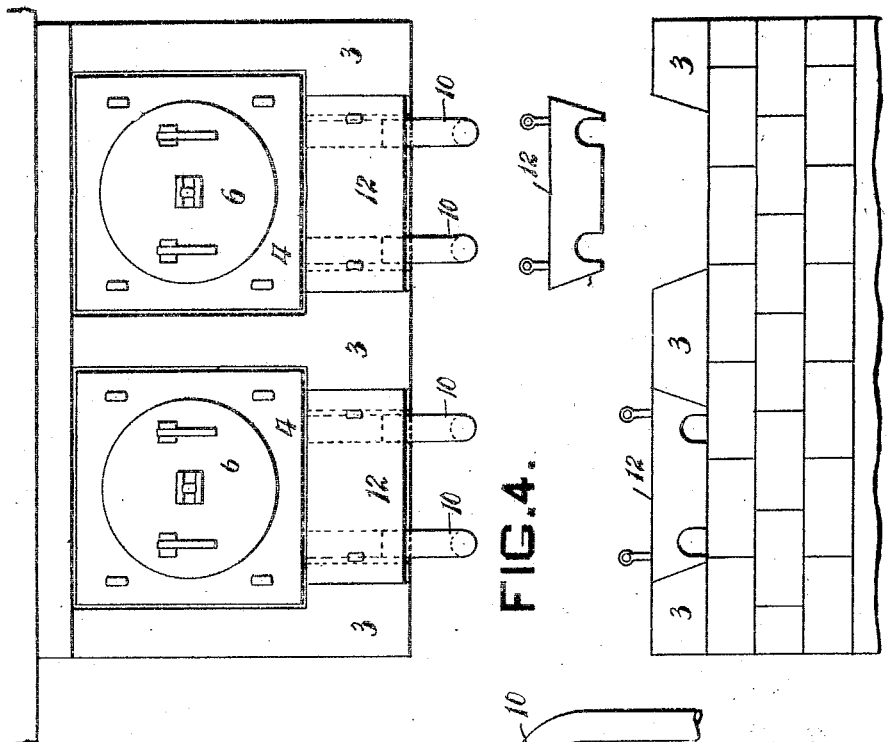
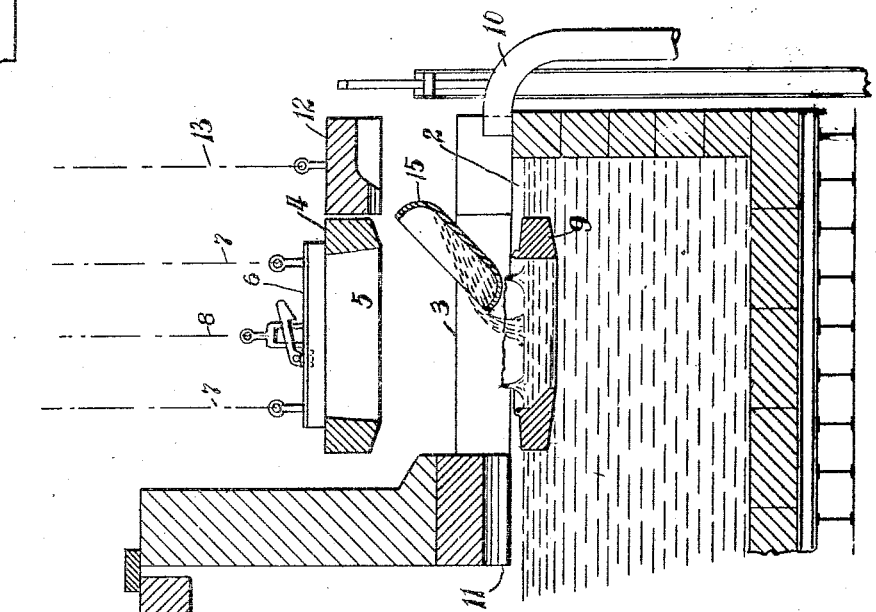
INVENTOR.
James A. Chambers
by James K. Bakewell
his
ATTORNEY.

UNITED STATES PATENT OFFICE.

JAMES A. CHAMBERS, OF PITTSBURGH, PENNSYLVANIA.

MANUFACTURE OF GLASS.

1,309,274.     Specification of Letters Patent.     Patented July 8, 1919.

Application filed October 8, 1918. Serial No. 257,405.

*To all whom it may concern:*

Be it known that I, JAMES A. CHAMBERS, of Pittsburgh, in the county of Allegheny and State of Pennsylvania, have invented a certain new and useful Improvement in the Manufacture of Glass, of which the following is a full, clear, and exact description, reference being had to the accompanying drawings, forming part of this specification, in which—

Figure 1 is a vertical, sectional view of the drawing-tank of a glass-tank furnace, showing the parts in position for drawing a cylinder of glass; Fig. 2 is a like view showing the parts in position for cutting off the cylinder after it has been drawn; Fig. 3 is a like view showing the parts in position for pouring molten glass into the drawing ring after the cylinder has been cut off and removed; Fig. 4 is a plan view of the drawing-tank; and Fig. 5 is a front elevation of the brick work of the same.

In the drawing of glass cylinders from a tank in the manufacture of window glass, it is usual to draw the glass through a drawing-ring which rests on the surface of the molten glass in the tank and through a cover-slab, having a central aperture, which during the drawing operation rests on the drawing ring; and, when the cylinder has been drawn to the desired length, it is separated from the glass in the tank by projecting flame against the lower portion of the cylinder, the cover-slab being raised sufficiently from the drawing ring to form an inclosed space about the cylinder, through which space the flame is caused to pass. The cylinder is then removed, and the stump or remnant of hardened glass, which constituted the lower portion of the cylinder, is left at the surface of the molten glass in the tank and must be re-melted before a second cylinder can be drawn through the same drawing-ring, which re-melting is accomplished by placing a cover on the aperture in the cover-slab and continuing the flame over the surface of the glass in the drawing-tank. The disadvantages incident to this method are the loss of time required in this re-melting operation, and the heating of the molten glass in the drawing-tank to a temperature greater than that at which the best result in drawing the cylinder can be obtained.

The object of my invention is to re-melt the hardened glass, left in the drawing-tank after the cylinder has been removed, rapidly and without unduly affecting the temperature of the molten glass in the drawing tank; and it consists in melting the hardened glass by bringing molten glass of a greater temperature in contact therewith, preferably by pouring molten glass, of a higher temperature than the glass in the drawing portion of the tank, through the drawing-ring, which as it melts the hardened glass is itself thereby reduced in temperature.

I will now so describe my invention that others skilled in the art may employ the same.

In the drawings I show a portion of a tank-furnace such as is in use in the manufacture of glass-cylinders, although I do not desire to limit my invention thereto, in which drawings, 2 represents the drawing-tank which communicates with the tank-furnace. This drawing-tank is provided with a top 3 having removable sections or slabs 4 in which are circular apertures, at 5, over which may be fitted removable covers 6. These slabs 4 and covers 6 may be raised by means of chains indicated by dotted lines at 7, and 8. Inside of the drawing-tank below the slabs 4, and at the surface of the molten glass in the tank, are the drawing rings 9 through which the glass cylinders may be drawn in the usual manner. In the front wall of the drawing tank are apertures through which gas pipes 10 extend to discharge gas into the tank on a horizontal plane directly above the drawing ring toward a flue 11, which opens from the drawing-tank into the tank-furnace. Above the gas pipes 11 are removable blocks 12 which may be raised vertically by means of chains indicated in Fig. 3 of the drawings by a dotted line at 13.

In the drawing of the glass-cylinders, the parts being in the positions shown in Fig. 1, the cylinder 14 is drawn in the usual manner. When the cylinder has been formed, the cover-slab 4 is raised to the position shown in Fig. 2, and gas is caused to enter the space between the slab 4 and the drawing ring 9, which causes flame to be projected against the lower portion of the cylinder, which, with an accelerated moving of the drawing of the cylinder, separates it from the molten glass in the tank, and the cylinder is withdrawn, while the stump of hardened glass remains at the surface of the molten glass in the drawing ring in the tank.

At this point in the operation, instead of placing the cover 6 on the aperture 5 in the slab 4, and continuing flame over the surface of the glass in the tank as has heretofore been the practice in this type of furnace, I raise the slab 4 and the block 12 to the positions shown in Fig. 3, and introduce molten glass into the tank furnace on top of the hardened glass, and preferably through the drawing-ring 9, by means of a ladle 15, the glass so introduced being of a greater temperature than the glass in the drawing-tank, that is, if the glass in the drawing tank after the cylinder has been drawn is at a temperature of from eighteen hundred to twenty hundred degrees F., the molten glass introduced should be of about twenty to twenty-three hundred degrees, which serves to re-melt the hardened stump of glass, and, also displaces the remnant by displacing the molten glass resulting from the melting thereof, forcing it out of the drawing-ring; and as the glass which is poured into the ring is thereby reduced in temperature the molten glass in the ring in the tank is brought to the proper temperature for drawing another cylinder from the tank through the same drawing ring without the excessive loss of time incident to the melting of the hardened glass by flame and the subsequent cooling of the glass in the tank to the temperature required in the drawing of the glass.

Although I have shown a tank-furnace having a cover-slab of the usual thickness necessary to the retention of the heat during the re-melting operation, it will be found that a much thinner slab may be employed in my process, which would enable the cylinder as it is formed to pass more directly into the coolness of the atmosphere, thus hardening the glass of the cylinder at a point closer to the molten glass, enabling the cylinder to be drawn more rapidly. I do not desire, however, to limit my process to the type of furnace shown, nor do I desire to limit it to the introduction of the molten glass by means of a ladle, or to the exact temperatures I have stated, as these are matters which may be varied by those skilled in the art.

What I claim and desire to secure by Letters Patent is:

1. In the manufacture of glass, drawing an article from a mass of molten glass sufficient to produce a plurality of articles, separating the article from the mass of molten glass, and melting the remnant of the article in the mass of molten glass by the addition of molten glass of a greater temperature than the temperature of the glass to which it is added.

2. In the manufacture of glass, drawing an article from a mass of molten glass sufficient to produce a plurality of articles, separating it from the molten glass, and pouring molten glass of a higher temperature upon the remnant of the article adhering to the mass of glass, to re-melt and displace the remnant.

In testimony whereof, I have hereunto set my hand.

JAMES A. CHAMBERS.

Witnesses:
JAMES K. BAKEWELL,
SUE B. FRITZ.